United States Patent
Keller et al.

(10) Patent No.: US 10,622,606 B2
(45) Date of Patent: Apr. 14, 2020

(54) ENERGY STORE FOR A VEHICLE AND METHOD FOR PROVIDING AN ENERGY STORE FOR A VEHICLE

(71) Applicant: Dr. Ing. h.c. F. Porsche Aktiengesellschaft, Stuttgart (DE)

(72) Inventors: Ralf Keller, Niefern-Oschelbronn (DE); Eduard Ewert, Karlsruhe (DE)

(73) Assignee: Dr. Ing. h.c.F. Porsche Aktiengesellscahft (DE)

( * ) Notice: Subject to any disclaimer, the term of this patent is extended or adjusted under 35 U.S.C. 154(b) by 149 days.

(21) Appl. No.: 14/740,325

(22) Filed: Jun. 16, 2015

(65) Prior Publication Data

US 2015/0372267 A1 Dec. 24, 2015

(30) Foreign Application Priority Data

Jun. 24, 2014 (DE) .................... 10 2014 108 803

(51) Int. Cl.
*H01M 2/10* (2006.01)
*B60L 50/60* (2019.01)

(52) U.S. Cl.
CPC .......... *H01M 2/1083* (2013.01); *B60L 50/66* (2019.02); *H01M 2/1077* (2013.01); *H01M 2/1094* (2013.01); *H01M 2220/20* (2013.01); *Y02T 10/705* (2013.01); *Y02T 10/7005* (2013.01); *Y10T 29/4911* (2015.01)

(58) Field of Classification Search
CPC ............ H01M 2/1083; H01M 2/1094; H01M 2/1077; H01M 2220/20; H01M 2/14; H01M 2/18; B60L 11/18; B60K 1/04; Y01T 29/4911

USPC .................. 429/149, 66, 99; 29/623.1–623.5
See application file for complete search history.

(56) References Cited

U.S. PATENT DOCUMENTS

| | | | | |
|---|---|---|---|---|
| 4,109,064 A | * | 8/1978 | Warner | H01M 2/10 180/68.5 |
| 8,623,536 B2 | * | 1/2014 | Jeon | H01M 2/1016 429/120 |
| 2006/0286441 A1 | | 12/2006 | Matsuoka et al. | |
| 2010/0119927 A1 | | 5/2010 | Bauer | |
| 2011/0250491 A1 | * | 10/2011 | Kim | H01M 2/0207 429/176 |
| 2014/0045025 A1 | | 2/2014 | Fritz et al. | |

FOREIGN PATENT DOCUMENTS

| | | |
|---|---|---|
| DE | 10 2008 059 941 | 6/2010 |
| DE | 10 2011 016 081 | 11/2011 |

OTHER PUBLICATIONS

German Search Report dated Feb. 13, 2015.
Chinese Office Action dated Feb. 3, 2019.
Chinese Office Action dated Nov. 3, 2017.

* cited by examiner

*Primary Examiner* — Robert S Jones
*Assistant Examiner* — Claire L Roe
(74) *Attorney, Agent, or Firm* — Gerald E. Hespos; Michael J. Porco; Matthew T. Hespos

(57) ABSTRACT

An energy store for a vehicle has an energy store cell arrangement and a housing that at least partly covers the energy store cell arrangement. A compensation apparatus is arranged between the housing and the energy store cell arrangement.

6 Claims, 3 Drawing Sheets

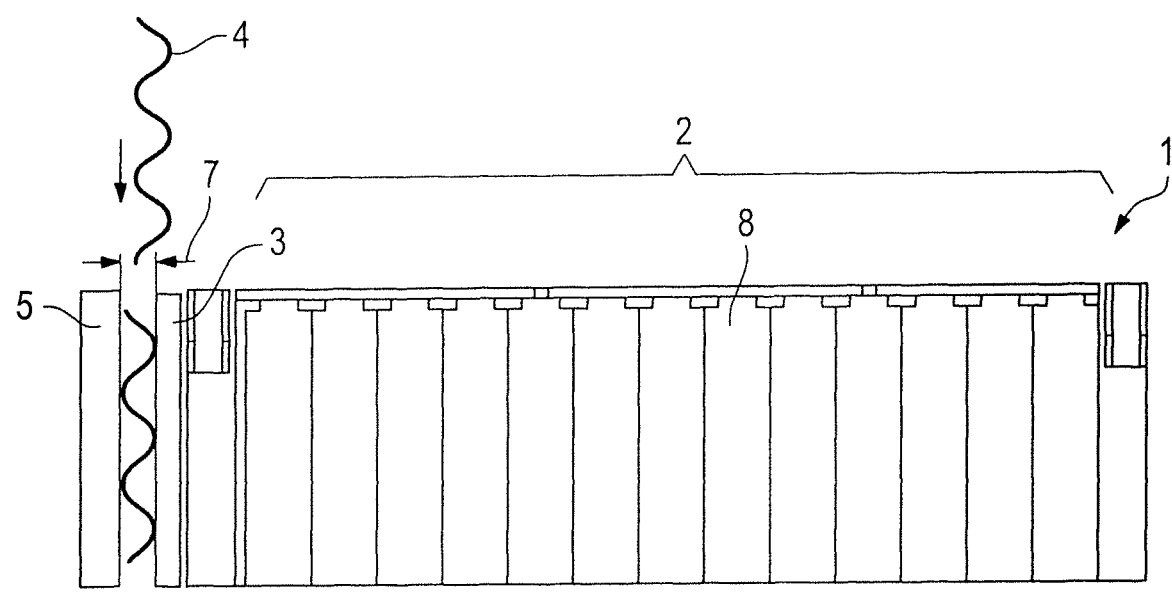
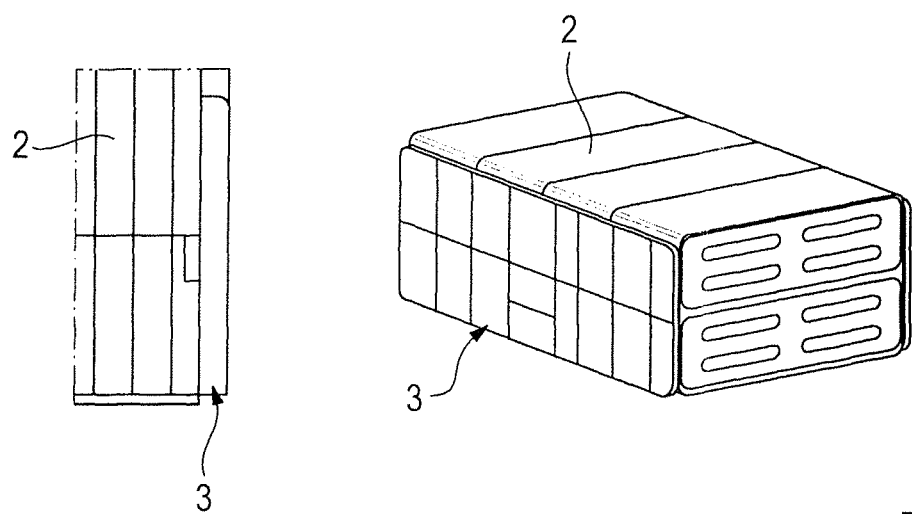

ENERGY STORE FOR A VEHICLE AND METHOD FOR PROVIDING AN ENERGY STORE FOR A VEHICLE

CROSS REFERENCE TO RELATED APPLICATION

This application claims priority under 35 USC 119 to German Patent Appl. No. 10 2014 108 803.4 filed on Jun. 24, 2014, the entire disclosure of which is incorporated herein by reference.

BACKGROUND

1. Field of the Invention. The invention relates to an energy store for a vehicle and to a method for providing an energy store for a vehicle.

2. Description of the Related Art. Energy stores can be used as a drive for electric vehicles or hybrid vehicles. The energy stores that are integrated into the vehicle typically have to be protected against high load or acceleration peaks that occur, for example, in a crash situation. DE 10 2011 016 081 A1 discloses an apparatus that mounts the entire energy store in a sprung manner in the vehicle for protection.

The energy stores that are integrated into the vehicle typically comprise a housing and energy store cells embedded in the housing. Clearances typically are formed between the housing and the energy store cells due to manufacturing tolerances and as a result of the production process of the housing. Overloading that occurs, for example, in the case of pronounced braking, acceleration or in a crash situation can cause a relative movement of the energy store cell arrangement with respect to the housing due to the clearance. This relative movement can lead to damage of one or more energy store cells of the energy store and/or can deform the housing. The prior art has no way to prevent this undesired relative movement within the energy store.

It is an object of the invention to provide an energy store, in which damage to the energy store cell arrangement or the individual energy store cells can be avoided even in the case of high load or acceleration peaks, for example in the crash situation.

SUMMARY OF THE INVENTION

An energy store in accordance with the invention has an energy store cell arrangement, a housing and a compensation apparatus arranged between the housing and the energy store cell arrangement. The compensation apparatus suppresses or dampens relative movement of the energy store cell arrangement with respect to the housing. As a result, damage in response to load or acceleration peaks, such as those in a crash situation, can be avoided.

The energy store cell arrangement may be covered at least partially by the housing, and the compensation apparatus is embedded in a clearance of the energy store between the energy store cell arrangement and the housing. The clearance may be caused by way of a production method of the housing. The compensation apparatus may be configured or structured to be meandering and to bear directly or indirectly against the energy store cell arrangement and/or against the housing at one or plural contact points. The compensation apparatus may be arranged in the clearance between the housing and the energy store cell arrangement in a manner to fill the installation space and may be inserted subsequently. As a result, the energy store can be adapted to its later field of use in an optimum manner. For example, the compensation apparatus may be attached on a side of the housing that is loaded to a particularly pronounced extent in the case of a load or acceleration peak. The compensation apparatus may be arranged in the clearance in such a way that a damping action of the compensation apparatus is directed substantially parallel to a direction defined by the driving direction of the vehicle.

The energy store may further comprise a deformation element between the energy store cell arrangement and the housing. The deformation element controls the load distribution between the housing wall, and the energy store cell arrangement to avoid local housing overloading. Furthermore, the deformation element can reduce local and global deformations of the housing in a crash situation. This reduced susceptibility of the housing to deform also increases the robustness of the energy store.

The deformation element may electrically insulate the energy store cell arrangement from the housing in the case of overloading. Furthermore, it is advantageously possible to relieve a possible link, for example in the form of a screw connection, between the housing and the energy store cell arrangement by way of the deformation element in the case of overloading. The deformation element may be manufactured at least partially from plastic, rubber, BONDAL or organosheet. Furthermore, the deformation element also may be introduced subsequently into the energy store. However, the deformation element also may be an integral constituent part of the energy store cell arrangement, with the deformation element covering or enclosing the energy store cells at least partially.

The compensation apparatus may bear flatly against an inner wall of the housing, against the energy store cell arrangement and/or against the deformation element. It is also conceivable that the compensation apparatus bears flatly toward one side, for example toward the housing, and bears against the energy store cell arrangement via one or more contact points toward. However, it is also conceivable that the compensation apparatus bears both against the housing wall and against the electrode arrangement at a plurality of contact points that may be offset with respect to one another. The compensation apparatus may extend substantially along an entire side face of the energy store cell arrangement. As a result, the positive effect of the compensation apparatus is distributed uniformly to the energy store cell arrangement.

The compensation apparatus may be arranged in a slip-resistant manner between the housing and the electrode arrangement and may be clamped or braced between the housing and the energy store cell arrangement. As a result, fixing the energy store cell arrangement relative to the housing can be improved further.

The compensation apparatus may be elastically deformable and may comprise a spring element. As a result, the compensation apparatus can be pressed into the clearance despite fluctuations in the dimensions of the clearance, for example in the case of a varying gap width of the clearance along its extent. The extent of the compensation apparatus along the direction, along which a restoring force of the elastically deformable compensation apparatus acts may exceed the greatest gap width of the clearance.

The compensation apparatus may be fixed on the housing, the electrode arrangement and/or the deformation element and may be connected frictionally and/or non-positively to the housing, the electrode arrangement and/or the deformation element. The compensation apparatus may be connected to the electrically insulating deformation element. As a result, the compensation apparatus may be manufactured at least partially from a metal and advantageously may be insulated electrically from the energy store cell arrangement. However, the energy store cell arrangement may have an electrically insulating framework, in which the energy store cells are arranged, and the compensation apparatus may be fastened to the framework. The rigid connection of the compensation apparatus advantageously prevents the compensation apparatus from slipping and possibly losing its positive effect in the crash situation.

The compensation apparatus may comprise a metallic spring element. As a result, a particularly loadable and long-life compensation apparatus can advantageously be integrated into the energy store.

The compensation apparatus may be arranged between the housing and the electrode arrangement along a direction defined by the driving direction of the vehicle. The compensation apparatus therefore may be arranged on one of the ends of the energy store that is arranged in the vehicle. In this regard, the compensation apparatus may be arranged at those points in the energy store that are stressed or loaded most in the case of a load or acceleration peak, in particular in the crash situation.

The compensation apparatus may be of modulated configuration. A modulation amplitude of the compensation apparatus may extend substantially along a direction that runs parallel to the restoring force of the elastically deformable compensation apparatus and/or parallel to the driving direction.

The invention also relates to a method for providing an energy store for a vehicle. The method may comprise providing an energy store with an energy store cell arrangement covered at least partially by a housing. The method then may arrange a compensation apparatus between the housing and the energy store cell.

In contrast to the prior art, an energy store can be optimized for its use in a vehicle by way of the method. In particular, the energy store is protected by way of the compensation apparatus against damage in the case of load or acceleration peaks.

Further details, features and advantages of the invention will be apparent from the drawings and from the following description of preferred embodiments using the drawings. Here, the drawings illustrate merely exemplary embodiments of the invention and do not restrict the essential concept of the invention.

BRIEF DESCRIPTION OF THE DRAWINGS

FIG. 1 shows an energy store in a first embodiment of the invention.

FIG. 2 shows an energy store in a second embodiment of the invention.

DETAILED DESCRIPTION OF THE PREFERRED EMBODIMENTS

Figure 3:
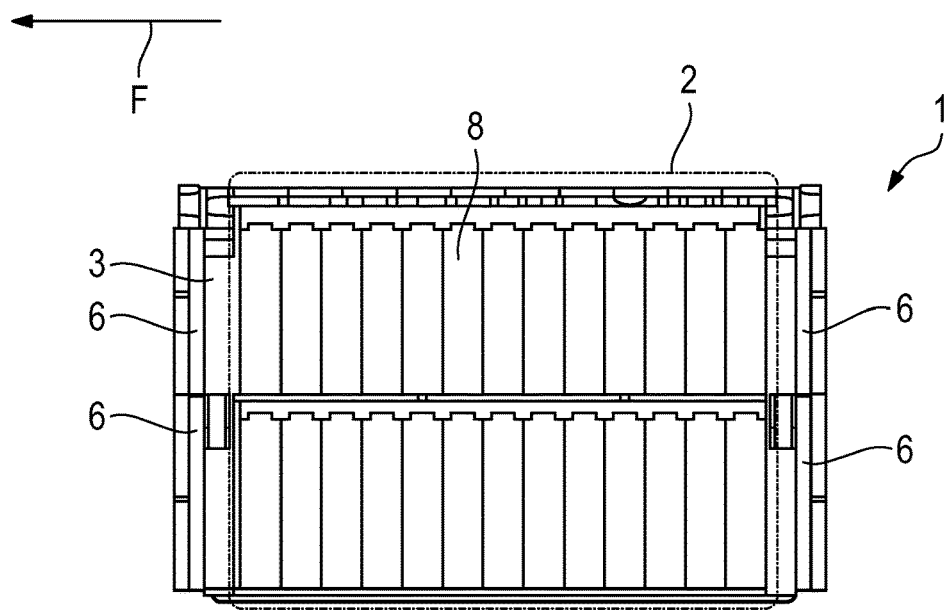
FIG. 3 shows an energy store without a compensation apparatus.

In the various figures, identical parts are always provided with identical designations and will therefore as a rule also be named or mentioned in each case only once.

FIG. 1 diagrammatically shows an energy store 1 according to a first embodiment of the invention. The energy store 1 preferably is provided for a vehicle, such as a hybrid or electric vehicle. The energy store 1 comprises an energy store cell arrangement 2 with energy store cells 8 that preferably are parallel to one another and adjacent to one another. The energy store cell arrangement 2 is disposed in a housing 5 to protect the energy store cells 8. Furthermore, a deformation element 3 is disposed on an end of the energy store arrangement 2. The deformation element 3 is provided for functional securing and protects the energy store cell arrangement 2 against direct contact with the housing 5. A clearance 6 or gap is arranged between the energy store cell arrangement 2 or the deformation element 3 and the housing 5. The clearance 6 is produced because the housings 5 are subjected to manufacturing tolerances during production and/or demolding bevels are formed during casting. The clearance 6 between the housing 5 and the energy store cell arrangement 2 is not uniform. In the embodiment of FIG. 1, the clearance 6 is of wedge-shape so that a gap width 7 becomes smaller along a direction of extent of the clearance. A compensation apparatus 4 is arranged between the energy store cell arrangement 2 or the deformation element 3 and the housing 5 to stabilize the energy store cell arrangement 2 within the housing 5. The energy store cell arrangement 2 advantageously is protected by the compensation apparatus 4 against a damaging impact on the housing, in particular in a crash situation. A spring steel is provided as a compensation apparatus 4 and is arranged between the housing 5 and the energy store cell arrangement 2 after the energy storage arrangement 2 is disposed in the housing 5. The compensation apparatus 4 has a width that exceeds the gap width 7 of the gap between the energy store cell arrangement 2 and the housing 5. The compensation apparatus 4 is pressed into the gap between the housing 5 and the energy store cell arrangement 2. As a result, the energy store cell arrangement 2 can advantageously be fixed in a particularly stable manner with respect to the housing 5 in a crash situation.

FIG. 2 shows an energy store 1 according to a second embodiment. In addition to the deformation elements 3 on the ends of the energy store 1, as shown in FIG. 1, the energy store 1 of FIG. 2 has a deformation element 3 along its longitudinal side. Independently of the positioning of the deformation element 3, it is provided that the deformation element 3 ensures controlled load distribution between the housing 5 and the energy store cell arrangement 2, as a result of which local housing overloading can be avoided in an advantageous way. Furthermore, global and local deformations, for example in the crash situation, can be reduced by the deformation element 3. It is provided, furthermore, that the deformation element 3 insulates the housing 5 electrically from the energy store cell arrangement 2. The deformation element 3 preferably is manufactured at least partially from plastic, rubber, BONDAL and/or organosheet. The deformation element 3 also increases the robustness of the housing 5, in particular of cast housings, by reducing the susceptibility of the energy store to deformations in the case of overloading. In particular, the links are relieved, via which the energy store cell arrangement 2 is connected, for example, to the housing 5. Furthermore, the compensation apparatus 4 may be manufactured from a metal and covered at least partially by an electrically insulating material.

FIG. 3 shows an energy store 1 without the compensation apparatus 4 and shows clearances 6 between the housing 5 and the energy store cell arrangement 2 along a direction that runs parallel to the driving direction F. The clearances 6 on the ends of the energy store 1 are filled with the compensation apparatus 4.

Figure 4:
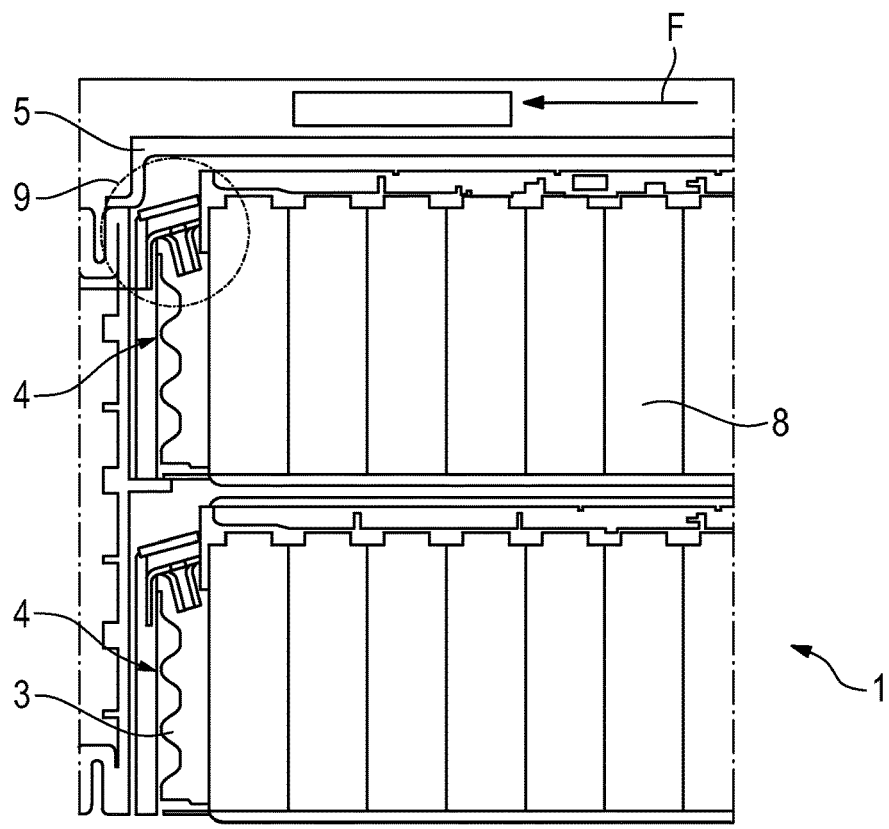
FIG. 4 shows an energy store in a third embodiment of the invention.

FIG. 4 shows an energy store 1 according to a third embodiment that has the compensation apparatus 4 arranged in a slip-resistant manner with respect to the energy store cell arrangement 2 via a frictional and/or non-positive connection 9. The compensation apparatus 4 preferably is fixed on the energy store cell arrangement 2, in particular on the deformation element 3, such as via a screw connection. As a result of the fixing, the compensation apparatus 4 is spaced apart at least partially from the energy store cell arrangement 2, in particular from the deformation element 3.

Figure 5:
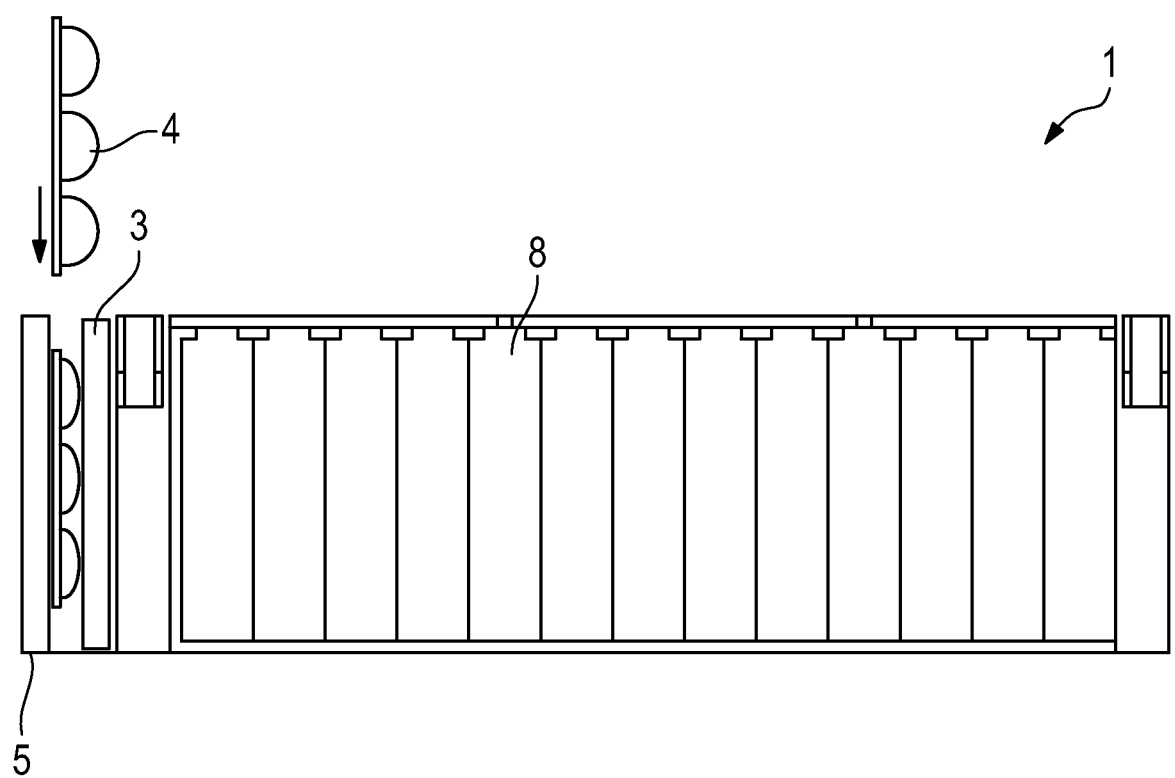
FIG. 5 shows an energy store in a fourth embodiment of the invention.

FIG. 5 shows an energy store 1 according to a fourth embodiment. The fourth embodiment differs from the preceding embodiments merely as a result of the shape of the compensation apparatus 4 that subsequently is pushed into the clearance 6. The compensation apparatus 4 is of modulated configuration so that the compensation apparatus 4 that has been pushed in bears against the deformation element 3 at various contact points. The contact points preferably are distributed uniformly.

What is claimed is:

1. An energy store for a vehicle, the energy store avoiding damage in response to a high load an acceleration peak in a crash situation, comprising:
   a housing having front and back walls spaced apart in the driving direction of the motor vehicle;
   an energy store cell arrangement provided in the housing so that a clearance is formed in the driving direction between the energy store cell arrangement and one of the front and back walls of the housing;
   a plastic or rubber deformation element in the clearance between the energy store cell arrangement and one of the front and back walls of the housing, the deformation element covering a surface of the energy store cell arrangement substantially facing the one of the front and back walls from a top end to a bottom end of the energy store cell arrangement and being of substantially uniform thickness from the top end to the bottom end of the energy store cell arrangement; and
   a compensation apparatus between the housing and the deformation element, the compensation apparatus being inserted along an insertion direction that is transverse to the driving direction and extending substantially from a top end to a bottom end of the deformation element along the insertion direction, the compensation apparatus having a plurality of curves interconnected to one another, the curves having apices that are spaced from one another along the insertion direction, the curves defining a meandering shape so that the apices of the curves that are adjacent to one another in the insertion direction face in opposite directions toward one of the housing and the energy store cell arrangement, each of the curves having an amplitude extending parallel to the direction of travel so that a damping action of the compensation apparatus is substantially parallel to the driving direction of the vehicle for avoiding damage to the energy store cell arrangement in response to a high load or an acceleration peak in a crash situation.

2. The energy store of claim 1, wherein the compensation apparatus is arranged in a slip-resistant manner between the housing and the energy store cell arrangement.

3. The energy store of claim 1, wherein the compensation apparatus is elastically deformable.

4. The energy store of claim 1, wherein the compensation apparatus is fixed on at least one of the housing, the energy store cell arrangement and/or on the deformation element.

5. The energy store of claim 1, wherein the compensation apparatus comprises a metallic spring element.

6. A method for providing an energy store for a vehicle, comprising:
   providing a housing;
   positioning an energy store cell arrangement in the housing so that a clearance is formed between a front or back wall of the housing in a driving direction of the vehicle and the energy store cell arrangement;
   positioning a plastic or rubber deformation element of substantially uniform thickness in the clearance between the energy store cell arrangement and one of the front and back walls of the housing so that the deformation element covers a surface of the energy store cell arrangement substantially facing the one of the front and back walls from a top end to a bottom end of the energy store cell arrangement; and
   inserting a compensation apparatus in an inserting direction transverse to the driving direction of the vehicle and into a space between the housing and the deformation element so that the compensation apparatus extends substantially from a top end to a bottom end of the deformation element along the insertion direction, the compensation apparatus having a plurality of interconnected curves spaced apart along the inserting direction and configured to sequentially resiliently engage the housing and/or the energy store cell arrangement during insertion into the clearance, the curves defining a meandering shape so that apices of the curves that are adjacent to one another in the insertion direction face in opposite directions toward one of the housing and the energy store cell arrangement for avoiding damage to the energy store cell arrangement in response to a high load or an acceleration peak in a crash situation.

* * * * *